United States Patent [19]

Brusse

[11] Patent Number: 5,339,626
[45] Date of Patent: Aug. 23, 1994

[54] INFLATABLE ENGINE PROTECTION SYSTEM FOR RECOVERABLE ROCKET BOOSTER

[75] Inventor: Jaime R. Brusse, Silver Springs, Md.

[73] Assignee: General Dynamics Corporation, San Diego, Calif.

[21] Appl. No.: 149,396

[22] Filed: Nov. 9, 1993

[51] Int. Cl.$^5$ ................................................ B64G 1/62
[52] U.S. Cl. ........................... 60/271; 239/265.11; 244/160; 244/138 R; 244/121
[58] Field of Search .............. 60/253, 255, 257, 271; 89/1.809, 1.810; 239/265.11, 288, 288.5; 244/121, 138 R, 160

[56] References Cited

U.S. PATENT DOCUMENTS

| | | | |
|---|---|---|---|
| 3,170,288 | 2/1965 | Penza et al. | 60/255 |
| 3,286,951 | 11/1966 | Kendall | 244/160 |
| 4,832,288 | 5/1989 | Kendall et al. | 244/160 |
| 4,961,550 | 10/1990 | Hujsak | 244/138 R |
| 5,083,728 | 1/1992 | Heck | 244/160 |
| 5,125,318 | 6/1992 | Purser | 89/1.809 |

*Primary Examiner*—Richard A. Bertsch
*Assistant Examiner*—William J. Wicker
*Attorney, Agent, or Firm*—John R. Duncan; Frank D. Gilliam

[57] ABSTRACT

A rocket engine protection system for a recoverable rocket booster which is arranged to land in a salt water body for recovery. The system includes an inflatable water impermeable elastomeric bladder that may be fabricated of a silicone impregnated woven Kevlar material and which is stowed in a deflated condition on a rotatable arm that is journalled to the lower portion of the nozzle of a liquid rocket booster. The deflated bladder and the rotatable arm are protected by a pod cover that is hinged to the outer portion on the nozzle. During the controlled descent of the liquid rocket booster by parachute for landing in a salt water body the pod cover is released and opened upwardly by a gas cylinder actuator. The rotatable arm which is biased by a torsion spring is then permitted to rotate around to position the deflated bladder in a deployed position within the interior of the lower portion of the nozzle. The bladder is then inflated to form a plug within the nozzle. A gasket is provided on the outer perimeter of the inflated plug to assist in sealing the plug against entry of sea water into the

30 Claims, 1 Drawing Sheet

INFLATABLE ENGINE PROTECTION SYSTEM FOR RECOVERABLE ROCKET BOOSTER

BACKGROUND OF THE INVENTION

1. Field of the Invention

This invention relates to an improvement in space vehicles and more particularly, but not by way of limitation, to a deployable pressurizable bag to fill the aft end of the nozzle of a recoverable rocket booster to preclude entry of salt water into the booster upon landing in a salt water boy for recovery and thereby protect the rocket engine from damage and to eliminate the need for refurbishment of the rocket engine after ocean recovery.

2. Description of the Prior Art

It is well known in the art, to associate a number of solid and liquid rocket boosters and a space vehicle in order to launch a space vehicle or a payload into a desired orbit around the earth or other desired extra-terrestrial path. It is common to use solid rocket boosters and liquid propellant rocket boosters to propel the associated space vehicle to at least a desired first stage of travel. At present, after a launch an attempt is made only to recover, refurbish and reuse solid rocket boosters. The reason for this is that rocket boosters commonly descend into salt water bodies for recovery. Salt water damage to a solid rocket booster is considered to be of minor consequence since the relatively simple rocket motors of such boosters are completely rebuilt prior to reuse. However, in the instance of liquid propellant rocket boosters the crash damage to the rocket body and the subsequent entry of salt water into the thrust chambers and interior of the complex liquid propellant turbopumps render a liquid rocket booster incapable of reuse without having first undergone expensive major overhaul and refurbishment.

Accordingly, it is of paramount importance if an attempt is to be made to reuse a liquid propellant rocket booster to protect the rocket engine from potential impact damage as the liquid rocket booster descends into a salt water body, such as an ocean, and to preclude resulting environmental damage to the engine prior to recovery of the rocket booster from the sea water. Failure to provide adequate protection from these dangers would render a liquid propellant rocket booster uneconomical to use in comparison to a solid rocket booster.

Past attempts at protecting a liquid propellant rocket from such damage have revealed substantial room for improvement. Such efforts have included large mechanically operated closures for the thrust end of the rocket engine. Such a closure was moved from a stowed position outboard of the booster to a deployed position so that the open end of the rocket engine would be sealed in the manner of sealing a jar with a lid.

These devices unfortunately are very heavy, involve complex mechanisms, and cause severe interface problems with the conventional means for securing a rocket booster and associated space vehicle to a launch pad. The problem of adequately protecting a liquid propellant rocket booster for recovery from a salt water body in a practical manner has not been provided by the prior art.

The present invention does provide a simple, low cost, lightweight practical solution to the problem of providing adequate protection for a liquid propellant rocket booster to enable reuse thereof after recovery from a salt water body.

The following patents, while of interest in the general field to which the invention pertains, do not disclose the particular aspects of the present invention that are of significant interest.

U.S. Pat. No. 4,961,550, assigned to the assignee of the present invention, is concerned with the same problem and discloses a rocket booster having a double walled skirt extension in which is disposed a water impermeable flexible sleeve means which extends from the booster after it has landed and is floating in sea water. The sleeve collapses against itself along its length and precludes migration of the sea water into the rocket engine and associated turbopumps. For a more complete description of the rocket booster, the disclosure of U.S. Pat. No. 4,961,550 is incorporated herein by reference.

U.S. Pat. No. 4,504,031 discloses an inflatable braking member that is deployed around a space vehicle by introducing gas into it. The braking member is jettisoned after the space vehicle leaves the atmosphere to enter a low earth orbit.

U.S. Pat. No. 4,638,947 relates to a rocket engine nozzle extension. A pneumatic bag within the fixed nozzle of a rocket engine is inflated to push and unfold the nozzle extension. After the nozzle extension is completely formed, the pneumatic bag may be jettisoned by firing the rocket engine.

U.S. Pat. No. 3,711,027 relates to an extendable nozzle for a rocket engine. The nozzle extension is deployable from a compactly stowed condition to an extended condition. A temporary jettisonable cover member is pressurized to unfurl the extendible nozzle and then is detached.

U.S. Pat. No. 3,482,783 relates to an inflatable rocket nozzle which includes pressure means that expand the inflatable nozzle when the rocket has risen to a predetermined altitude in the earth's atmosphere.

None of the prior art uncovered disclose an arrangement utilizing an inflatable pressurized bladder which acts as a plug to close the nozzle of a liquid rocket booster in a water sealing engagement prior to the landing of the booster in sea water. This arrangement protects a liquid propellant booster rocket from crash damage and environmental damage for recovery of the rocket booster from a sea water landing so as to permit reuse thereof without major overhaul. None of these previous efforts, however, provides the benefits attendant with the present invention.

It is a general object of this invention to provide an improved arrangement for precluding crash damage and sea water damage to a liquid propellant rocket booster when the booster returns to a salt water body for recovery.

It is a further general object of the invention to provide an improved engine protection arrangement for a recoverable rocket booster which is practical, economical to produce and install, and which is lightweight.

It is a specific object of the invention to prove an engine protection arrangement which utilizes a deployable pressurizable bladder which acts as a plug to substantially fill the lower portion of the nozzle of a recoverable rocket booster to preclude entry of salt water into the booster upon landing for a predetermined period of time to permit recovery.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawing.

SUMMARY OF THE INVENTION

The invention is defined by the appended claims with the specific embodiment shown in the attached drawing. Briefly stated, a preferred embodiment of the invention provides an engine protection system for a liquid rocket booster for a space vehicle that after launch is separable from the space vehicle and is adapted for landing in a salt water body for recovery and reuse. The engine protection system includes an inflatable water impermeable elastomeric bladder means that is detachably stowed in a deflated state on the outer perimeter of the nozzle of the liquid rocket booster. A rotatable arm means that is suitably journalled to the lower portion of the nozzle of the booster supports the deflated bladder means as well as actuable gas pressure means which are provided to selectively inflate the bladder means after deployment. The rotatable arm and the inflatable bladder means and the gas pressure means are releasably secured to the nozzle of the booster under a pod cover that is hingedly secured to the nozzle at its upper portion. The pod cover is locked in position during launch of the space vehicle and during return to earth. Just prior to splashdown of the booster in a salt water body the pod cover is released and driven open by a gas cylinder actuator thereby permitting the rotating arm to rotate and position the inflatable bladder means within the lower perimeter of the nozzle. The rotating arm is urged to a deployed position by a torsion spring which normally biases the arm toward such position. A rotary viscous damping means controls the speed of rotation of the rotating arm.

When the inflatable bladder means has been deployed the gas pressure means is actuable by a pyrotechnic valve to inflate the bladder means and to urge it against the interior wall of the nozzle to seal it against water entry. The bladder means is preferably provided with a gasket means disposed around its outer periphery to assist in sealing the bladder against the nozzle.

The inflated bladder thus acts as a plug in the nozzle to preclude water entry. The plug is pressurized to a pressure high enough to resist the water hydrostatic pressure at the depth to which it sinks in the salt water body after landing and to compensate for any pressure loss due to membrane or seam leakage of the bladder. The pressurized plug also provides structural reinforcement for the nozzle to prevent nozzle buckling under water entry and cavity collapse loads. Additionally, the volume the pressurized plug and the nozzle cavity provides sufficient buoyancy to provide adequate flotation for the rocket booster.

The foregoing has outlined rather broadly the more pertinent and important features of the present invention in order that the detailed description of the invention that follows may be better understood so that the present contribution to the art may be more fully appreciated. Additional features of the invention will be described hereinafter which from the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWING

For a fuller understanding of the nature and objects of the invention, reference should be had to the following detailed description taken in conjunction with the accompanying drawings in which.

DETAILED DESCRIPTION OF THE PREFERRED EMBODIMENT OF THE PRESENT INVENTION

Figure 1:
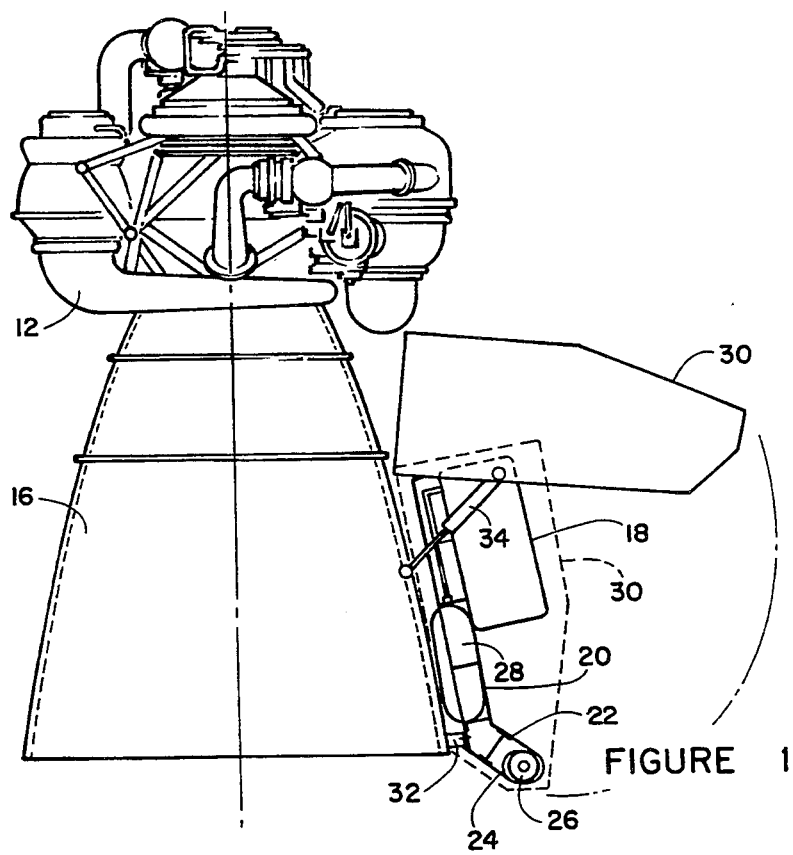
FIG. 1 is a showing of a cross sectional schematic of a liquid rocket booster protection arrangement illustrating the inflatable nozzle plug in its stowed position and FIG. 2 is a showing of the rocket booster of FIG. 1 with the inflatable nozzle plug in a deployed inflated position.
Figure 2:
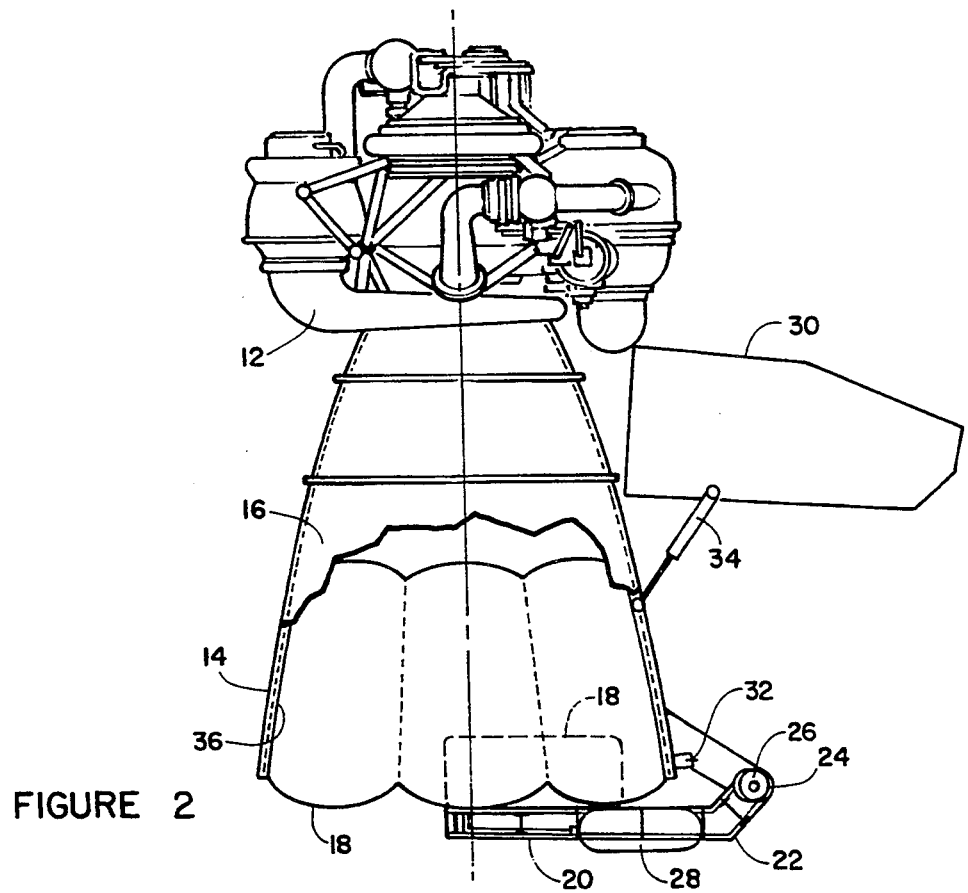

Referring now to the drawing Figures in detail, the reference character generally designates an engine protection system for a recoverable liquid propellant rocket booster constructed in accordance with a preferred embodiment of the present invention. The engine protection arrangement 10 is incorporated in to a liquid rocket booster 12 having a nozzle 14. As noted previously, the disclosure of U.S. Pat. No. 4,961,550 is incorporated by reference and shows the detail and arrangement of the various components of such a booster.

The interior of the nozzle skirt 14 is provided with a generally air tight sealed surface 16. The booster 12 is provided with suitable parachute means (not shown) which permit the rocket booster 12 after engine shut down separation from a space vehicle and helium purge to approach a salt water body in a controlled descent.

The engine protection arrangement includes a suitable inflatable water impermeable bladder means 18 that is detachably stowed in a deflated state on the outer perimeter of the nozzle 14 during launch and separation from the space vehicle. The bladder 18 is positioned upon a suitable rotatable arm 20 that is suitably journalled at its lower end to an arm 22 that extends downwardly and outwardly from the lower perimeter of the nozzle 14. The arm 20 is provided with a torsion spring 24 that normally urges the arm 20 in a clockwise direction to rotate the arm around to position the bladder 18 in a deployed position within the lower portion of the nozzle 14. The arm 20 is also provided with a rotary viscous damper 26 that controls the rate of rotation of the arm 20 when it is actuated.

The arm 20 also has secured to it a suitable gas generator means 28 that is suitably coupled to the inflatable bladder 18. The gas generator means 28 may take the form of a gas cylinder for storing nitrogen under pressure or a suitable solid propellant gas generator.

The arm 20 is maintained in a secured position until selective actuation by a protective pod cover 30 which is secured in a protective position by a suitable cover latch 32. The pod cover 30 may be fabricated of any suitable material such as aluminum provided with cork insulation. Prior to splashdown of the rocket booster in a saltwater body the cover latch 32 is unlatched by a suitable pyrotechnic activated cover release to permit the hinged pod cover 30 to be driven open by a suitable gas cylinder actuator 34 to a fully open position and thereby permit the rotating arm 20 to carry the inflatable bladder 18 and gas cylinder actuator 20 to the illustrated deployed position.

When the inflatable bladder 18 is placed in its deployed position a suitable pyrotechnic valve (not shown) is actuated to permit communication with the bladder 18 for inflation thereof. The bladder which is preferably formed of a material such as a silicone impregnated woven Kevlar material inflates to form the plug shape as seen in the drawing. Preferably, the bladder 18 is provided with a peripheral gasket 36 which may be a silicone foam gasket 36. The bladder 18 is preferably pressurized to a pressure sufficient to seal the gasket 36 against the interior 16 of the nozzle 14 to preclude entry of sea water into the nozzle 14. Preferably, the bladder would be pressurized to a pressure about 5 to 10 psig. This pressure is high enough to resist the water hydrostatic pressure at the depth to which the booster 12 settles in the sea water after splashdown and compensates for any pressure loss within the bladder 18 due to the membrane and seams of the bladder 18 leaking.

The pressurized plug 18 of the present invention provides further advantages over the prior art. The inflated plug extends sufficiently into the nozzle 14 and exerts sufficient internal pressure to provide structural reinforcement for the nozzle 14 to prevent nozzle buckling upon splashdown and entry into the sea water and also reduces cavity collapse loads on the nozzle since the plug is pressurized and traps and compresses additional air above the plug 18 in the nozzle 14.

The present disclosure includes that contained in the appended claims as well as that of the foregoing description. Although this invention has been described in its preferred form with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. In a liquid rocket booster for a space vehicle that has a turbopump driven rocket engine that has an annular exhaust nozzle and a parachute system which permits a controlled descent of the liquid rocket booster as it nears the earth for recovery in a salt water body after separation at a predetermined time from the space vehicle, which salt water body can cause impact damage and corrosion damage to the rocket engine, the improvement of an inflatable engine protection system which comprises:

inflatable water impermeable bladder means that is detachably stowed in a deflated state on the outer surface of the nozzle adjacent to the outlet end of the nozzle;
actuable means to deploy the deflated bladder means from its stowed position to an operative position within the nozzle prior to the booster landing in the salt water body;
said actuable means including a rotatable arm which is journalled at one end to the outer surface of the nozzle closely adjacent to the nozzle outlet end and carries said deflated bladder means at the other end;
said actuable means mounted for rotation in a plane that includes the nozzle centerline; and
means to inflate the bladder means so that it forms an inflatable water impermeable plug within the nozzle.

2. The engine protection system of claim 1 wherein the inflating means is carried by the rotatable arm for inflation of the bladder means within the nozzle of the liquid rocket booster.

3. The engine protection system of claim 1 wherein the inflatable means comprises a solid propellant gas generator.

4. The engine protection system of claim 1 wherein the bladder means is provided with a peripheral gasket means to enhance the sealing of the bladder means against the interior surface of the nozzle in its inflated condition to preclude water entry into the interior of the nozzle.

5. The engine protection system of claim 4 wherein the gasket means comprises a foam silicone gasket.

6. The engine protection system of claim 1 wherein the rotatable arm is biased by spring means which urge the rotatable arm from a stowed position to a deployed position.

7. The engine protection system of claim 6 wherein the spring means comprises a torsion spring which continuously urges the rotatable arm toward a deployed position.

8. The engine protection system of claim 7 wherein the rotatable arm includes a damping means which controls the rate of rotation of the rotatable arm to a deployed position.

9. The engine protection system of claim 8 wherein the damping means comprises a rotary viscous damper.

10. The engine protection system of claim 1 wherein the bladder means is sized sufficiently large so that in its inflated condition it extends into the interior of the nozzle and exerts sufficient pressure thereon to prevent, upon entry into the salt water body, buckling of the nozzle and to counteract cavity collapse loads as well as providing sufficient buoyancy to provide adequate flotation for the rocket booster in the salt water body prior to recovery.

11. The engine protection system of claim 10 wherein the bladder means is constructed from a silicone impregnated woven aramid material.

12. The engine protection system of claim 11 wherein the bladder means is inflated to at least 5 psig.

13. The engine protection system of claim 12 wherein the bladder means is inflated to about 5 to 10 psig.

14. The engine protection system of claim 1 wherein the inflating means comprises a pressurized gas storage means that is selectively coupled to the inflatable bladder means.

15. The engine protection system of claim 5 wherein the pressurized gas storage means contains sufficient pressurized gas to inflate the bladder means so as to form a water impermeable plug within the nozzle to resist water hydrostatic pressure against the nozzle after the rocket booster has settled into the salt water body and to overcome any inherent permeability of the bladder to salt water.

16. The engine protection system of claim 15 wherein the bladder means, actuable means, and inflating means are stowed within a protective cover means on the exterior of the nozzle until just prior to splashdown of the liquid rocket booster in a salt water body.

17. The engine protection system of claim 16 wherein the protective cover means comprises a pod cover that is hingedly secured and latched to the outer surface of the nozzle and which is selectively unlatched and openable to permit actuation of the rotating arm.

18. The engine protection system of claim 17 wherein the pod cover is unlatched by a pyrotechnic activated pod cover and driven to a predetermined open position by a gas cylinder actuator.

19. In a liquid rocket booster for a space vehicle that has a turbopump driven rocket engine that has an annular exhaust nozzle and a parachute system which permits a controlled descent of the liquid rocket booster as it nears the earth for recovery in a salt water body after separation at a predetermined time from the space vehicle, which salt water body can cause impact damage and corrosion damage to the rocket engine, the improvement of an inflatable engine protection system which comprises:

inflatable water impermeable bladder means that is detachably stowed in a deflated state on the outer surface of the nozzle;

actuable means to deploy the deflated bladder means from its stowed position to an operative position within the nozzle prior to the booster landing in the salt water;

said actuable means including a rotatable arm which is journalled at one end to the outer surface of the nozzle adjacent to the nozzle outlet end at a point spaced downstreamwardly and outwardly of the nozzle outlet end;

said actuable means includes a torsion spring for biasing said rotatable arm towards the deployed position; and means to inflate the bladder means so that it forms an inflatable water impermeable plug within the nozzle.

20. The engine protection system of claim 19 wherein the rotatable arm includes a damping means which controls the rate of rotation of the rotatable arm to a deployed position.

21. The engine protection system of claim 19 wherein the damping means comprises a rotary viscous damper.

22. The engine protection system of claim 19 wherein the bladder means is sized sufficiently large so that in its inflated condition it extends into the interior of the nozzle and exerts sufficient pressure thereon to prevent, upon entry into the salt water body, buckling of the nozzle and to counteract activity collapse loads as well as providing sufficient buoyancy to provide adequate flotation for the rocket booster in the salt water body prior to recovery.

23. The engine protection system of claim 19 wherein the bladder means is constructed from a silicone impregnated woven aramid material.

24. The engine protection system of claim 19 wherein the bladder means is inflated to at least 5 psig.

25. The engine protection system of claim 19 wherein the bladder means is inflated to about 5 to 10 psig.

26. The engine protection system of claim 19 wherein the bladder means is provided with a peripheral gasket means to enhance the sealing of the bladder means against the interior surface of the nozzle in its inflated condition to preclude water entry into the interior of the nozzle.

27. The engine protection system of claim 26 wherein the gasket means comprises a foam silicone gasket.

28. The engine protection system of claim 19 wherein the bladder means, actuable means, and inflating means are stowed within a protective cover means on the exterior of the nozzle until just prior to splashdown of the liquid rocket booster in a salt water body.

29. The engine protection system of claim 28 wherein the protective cover means comprises a pod cover that is hingedly secured and latched to the outer surface of the nozzle and which is selectively unlatched and openable to permit actuation of the rotating arm.

30. The engine protection system of claim 29 wherein the pod cover is unlatched by a pyrotechnic device and driven to a predetermined open position by a gas cylinder actuator.

* * * * *